United States Patent [19]

Kervagoret

[11] 4,223,694

[45] Sep. 23, 1980

[54] HYDRAULIC CIRCUIT BREAKER

[75] Inventor: Gilbert Kervagoret, Argenteuil, France

[73] Assignee: Societe Anonyme D.B.A., Paris, France

[21] Appl. No.: 916,382

[22] Filed: Jun. 16, 1978

[30] Foreign Application Priority Data

Jun. 21, 1977 [FR] France ............................... 77 18951

[51] Int. Cl.[2] ............................................ G05D 16/10

[52] U.S. Cl. ........................................ 137/118; 60/418

[58] Field of Search ............... 137/115, 116, 118, 508; 60/413, 418

[56] References Cited

U.S. PATENT DOCUMENTS

| | | | |
|---|---|---|---|
| 2,846,850 | 8/1958 | Hall | 60/418 |
| 3,393,945 | 7/1968 | Reichard | 137/118 |
| 3,752,176 | 8/1973 | King | 137/118 |
| 3,785,393 | 1/1974 | Tanguy | 60/418 |
| 3,915,186 | 10/1975 | Thomas | 60/418 |
| 4,016,895 | 4/1977 | Budecker | 137/118 |
| 4,073,140 | 2/1978 | Lang et al. | 137/118 |
| 4,131,125 | 12/1978 | Tanguy | 137/118 |
| 4,137,941 | 2/1979 | Gonin | 137/508 |

*Primary Examiner*—Alan Cohan
*Assistant Examiner*—H. Jay Spiegel
*Attorney, Agent, or Firm*—Paul David Schoenle; Ken C. Decker

[57] ABSTRACT

In a hydraulic circuit breaker comprising a housing with an inlet orifice connectable to the outlet of a hydraulic pump, a first outlet orifice connectable to the pressure chamber of a hydraulic pressure accumulator, and a second outlet orifice connectable to an open-center hydraulic circuit, a stepped bore in said housing, a piston of the differential type slidable in a fluid-tight manner in said bore and defining therewith an inlet chamber communicating with the inlet orifice and a control chamber, a constriction orifice of variable cross-section being provided between the inlet chamber and the second outlet orifice, and said inlet chamber communicating with said control chamber through a first passage comprising a first restriction and being also connected to the first outlet orifice by a connection comprising a non-return valve, there is further provided a resilient vessel having a variable-volume compartment connected to said control chamber, said vessel being adapted to connect said compartment to a second leakage passage forming a restriction when the pressure in said compartment reaches a first predetermined value, and to interrupt said connection to said leakage passage when the pressure in said compartment falls below a second predetermined value.

12 Claims, 1 Drawing Figure

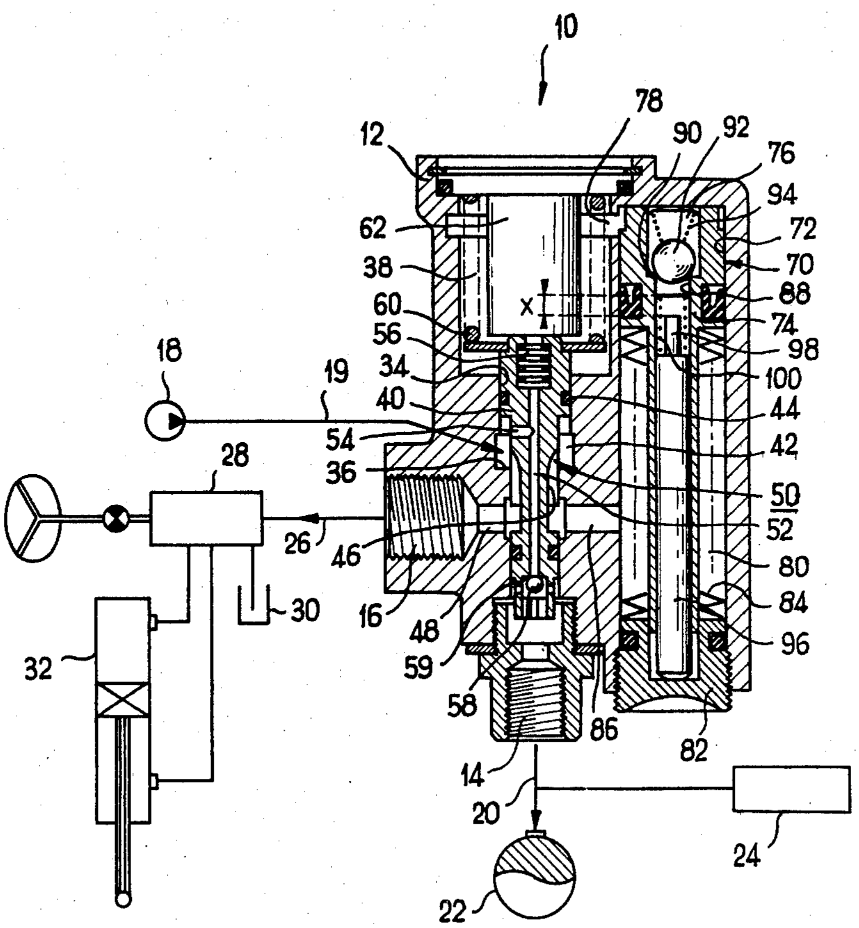
10
78
90
92
76
12
94
62
72
70
38
88
X
60
74
56
98
34
100
18
19
40
44
54
42
36
28
50
52
26
46
80
30
16
84
48
96
59
32
58
86
82
14
20
24
22

HYDRAULIC CIRCUIT BREAKER

The invention relates to a hydraulic circuit breaker, more particularly for charging a pressure fluid accumulator from a hydraulic pump.

In a hydraulic circuit in a motor vehicle comprising an open-centre hydraulic circuit, for example a power steering circuit, and a closed-centre hydraulic circuit of the brake-assisting circuit type, a pressure fluid accumulator is used as an auxiliary pressure source. If a load is applied to the accumulator, the pressure prevailing in its pressure chamber falls, possibly below the minimum tolerable level. The accumulator must then be recharged from the hydraulic circuit's pump, whose delivery is substantially constant, by way of such a circuit breaker. During normal operation, that is, outside the period when the accumulator is being charged and the power steering is being operated, the pump of substantially constant delivery supplies fluid at a low pressure of the order of 2 to 3 bars. During the charging period the pressure at the pump outlet may attain much higher values. Transient conditions may therefore be established at the beginning and end of the accumulator charging period, during which the variations in the fluid pressure delivered by the pump are particularly large. If these pressure variations are too rapid, fluid hammering occurs and may damage the components of the pump.

It is, therefore, an object of the invention to propose a hydraulic circuit breaker which alleviates these disadvantages and which makes it possible to spread over a period these pressure variations which occur during transient operation while the pump pressure is rising or falling, in the course of charging of the accumulator.

To this end, the invention proposes a hydraulic circuit breaker comprising a housing with an inlet orifice connectable to the outlet of a hydraulic pump, a first outlet orifice connectable to the pressure chamber of a hydraulic pressure accumulator, and a second outlet orifice connectable to an open-centre hydraulic circuit, a stepped bore in said housing, a piston of the differential type slidable in a fluid-tight manner in said bore and defining therewith an inlet chamber communicating with the inlet orifice and a control chamber, the pressures in said inlet chamber and control chamber acting respectively on those faces of the differential piston having the smaller and larger cross-sections, a constriction orifice whose cross-section is variable according to the position of the differential piston being provided between the inlet chamber and the second outlet orifice, said inlet chamber communicating with said control chamber through a first passage comprising a first restriction and being also connected to the first outlet orifice by a connection comprising a non-return valve, said circuit breaker further comprising a resilient vessel having a variable-volume compartment connected to said control chamber, said vessel being adapted to connect said compartment to a second leakage passage forming a restriction after the pressure in said compartment reaches a first predetermined value, and to interrupt said connection to said leakage passage when the pressure in said compartment falls below a second predetermined value.

In a preferred embodiment, the resilient vessel of a circuit breaker embodying the invention comprises a second bore defined in its housing, within which a second piston is slidable in a fluid-tight manner so as to divide said second bore into a first compartment defining said variable-volume compartment and into a second compartment, the second piston being urged towards the end of said first compartment by resilient means located in said second compartment, an axial passage intended to connect the two compartments being provided in said second piston and opening towards the first compartment to define a valve seat cooperating with a valve forming element resiliently urged onto the seat, a valve lifter forming element fixed relative to the housing being provided in said axial passage of the second piston, said valve lifter forming element being adapted to lift said valve forming element off its seat to permit fluid to flow in the leakage passage when the second piston has moved a given distance which corresponds to said first predetermined value for the pressure in the first compartment, the leakage passage then comprising the annular space defined between said valve lifter forming element and said axial passage, and the second compartment being connected to the second outlet orifice.

The invention will now be described with reference to the single FIGURE of the accompanying drawing, which represents a section through a hydraulic circuit breaker embodying the invention, associated by way of example only with a hydraulic circuit for a motor vehicle.

The single FIGURE illustrates a hydraulic circuit breaker generally designated 10 in its idle position. It comprises a housing 12 with an inlet orifice (not shown), a first outlet orifice 14 and a second outlet orifice 16. The inlet orifice (not shown) is connected to a hydraulic pump 18 of substantially constant delivery by a line 19. The first outlet orifice 14 is connected by a line 20 to the pressure chamber of an accumulator 22, designed, for example, to supply pressure fluid to a power-assisting circuit 24 of the closed-centre type, such as a hydraulic braking amplifier. The second outlet orifice 16 is connected by a line 26 to a power steering valve 28, which is connected in a known manner to a hydraulic fluid reservoir 30 and which has two working orifices connected to respective chambers of a power-assisting actuator 32.

The housing 12 contains a first, stepped bore 34, of which a smaller-diameter portion and a larger-diameter portion are arranged so as to define a shoulder 36. The larger-diameter portion of the bore 34 gives on to a control chamber 38 coaxial with the bore, whereas the smaller-diameter portion of the bore 34 is directed towards the first outlet orifice 14. A differential piston 40 is slidably received in the bore 34. It has a portion of larger diameter projecting into the control chamber 38, and a portion of smaller diameter which slides in the smaller-diameter portion of the bore 34 and of which the end is subjected to the pressure prevailing in the first outlet orifice 14. The differential piston 40 co-operates with the larger-diameter portion of the bore 34 and with shoulder 36 so as to define an annular chamber 42 communicating permanently with the pump 18 by way of the above-mentioned inlet orifice (not shown). An annular seal 44 is mounted on the larger-diameter portion of the differential piston 40, so that all fluid flowing between the chambers 42, 38 must pass through a restriction 56 provided in a passage defined below.

The piston 40 also contains longitudinal grooves 46, preferably obtained by milling, formed in its smaller-diameter portion. The grooves 46 can connect the annular chamber 42 to a radial passage 48 connected in turn to the second outlet orifice 16. The depth of the grooves 46 increases with the distance from the shoulder associated with the differential piston 40. Thus the grooves 46 are intended to co-operate with the shoulder 36 to form a constriction orifice 50 located in the fluid path between the pump 18 and the power steering valve 28, the cross-section of this constriction orifice being variable according to the position of the stepped piston 40.

The stepped piston 40 further contains an axial passage 52 connected to the annular chamber 42 by a radial passage 54. The axial passage 52 communicates with the control chamber 38 by way of the restriction 56, which in the embodiment illustrated comprises a stack of perforated flanged discs. The passages 52, 54 connect the annular chamber 42 and the outlet orifice 14. A non-return valve comprising a ball 58 co-operates with a seat 59 defined at that end of the axial passage 52 closer to the smaller-diameter face of the differential piston 40. To complete the description of the arrangement of the differential piston 40 in the housing 12, a spring 60 is provided in the control chamber 38 to bias the piston 40 resiliently, counteracting the pressure prevailing in the annular chamber 42 and also the pressure in the accumulator 22, which acts on the smaller-diameter end of the piston. In addition, an abutment 62 is provided in the control chamber 38 to limit entry of the differential piston 40 into this chamber.

The hydraulic circuit breaker 10 also comprises a resilient vessel generally designated 70, of variable volume. The resilient vessel comprises a second bore 72 defined in the housing 12 and containing a piston 74 slidable in a fluid-tight manner. This piston 74 divides the bore 72 into a first compartment 76, which communicates with the control chamber 38 by way of a passage 78, and into a second compartment 80 closed at its bottom end by a plug 82. In the idle position, the piston 74 is urged onto the end of the compartment 76 by a resilient assembly 84, located in the second compartment between the piston 74 and the plug 82. In the embodiment illustrated the resilient assembly 84 is formed, by way of example only, by a stack of spring washers. It should be noticed that the second compartment 80 communicates with the second outlet orifice 16, by way of a radial passage 86, the stepped bore 34 and the passage 48.

The piston 74 contains an axial passage 88 intended to connect the two compartments 76, 80. This passage leads into the first compartment 76 so as to define a valve seat 90 co-operating with a valve forming member 92 (in this case a ball) biased resiliently onto the seat by a weak spring 94. The axial passage 88 contains a valve lifter 96, which is fixed relative to the housing and ends in a finger 98. The axial position of the valve lifter 96 can be adjusted by means of the plug 82. In the idle position shown in the single FIGURE, the piston 72 is urged as far as possible in the direction of the first compartment by the resilient assembly 84. The end of the finger 98 is set back from the plane of the valve seat 90, and the ball 92 is held against the seat under the influence of the spring 94. Another spring 100, inside the passage 88, bears on the valve lifter 96 and surrounds the finger 98. When idle, the spring 100 is longer by a distance X than the finger 98, but is not long enough to bias the ball 92. The advantage of this feature will be explained below.

To complete the description of the resilient vessel, the valve lifter 96 is mounted in the axial passage 88 in such a way as to permit a restricted fluid flow between the first compartment 76 and the second compartment 80 by way of the annular space defined between the valve lifter 96 and the inside surface of the axial passage 88, when the ball 92 is held off its seat 90.

The hydraulic circuit breaker described hereabove operates as follows.

In the idle position illustrated, the accumulator 22 is charged. The pressure at the outlet orifice 14 holds the ball 58 onto its seat 59 and urges the differential piston 40 upwards as seen in the FIGURE, so that fluid can flow normally between the pump 18 and power steering valve 28. The resilient vessel is in the condition illustrated in the single FIGURE, and the ball 92 is urged onto its seat 90 by the spring 94. The entire pump delivery is now directed towards the power steering valve.

Let us assume now that a load is applied to the accumulator 22 so that the pressure in its pressure chamber drops below the switching pressure, that is, the minimum pressure at which it is designed to be used. The differential piston 40, biased by the spring 60, causes a reduction in the cross-section of the constriction 50 resulting from cooperation between the shoulder 36 and grooves 46. Since the delivery of the pump 18 remains substantially constant, the pressure in the annular chamber 42 rises, establishing a fluid flow from the chamber 42 to the chamber 38 by way of the restriction 56. As a result, the vessel 70 is charged progressively by way of the passage 78. The effect of this charge on operation of the vessel 70 will be explained below.

The pressure rise in the control chamber 38 is progressive and produces additional movement of the differential piston, with the effect of further reducing the cross-section of the constriction 50 situated in the fluid path between the pump outlet and the power steering valve 28. The pressure in the annular chamber 42 therefore rises progressively, leading to a further pressure rise in the control chamber 38. The piston 40 thus continues to move downwards in proportion to the increase in the pressure from the pump 18. This pressure increase proceeds progressively until the pump pressure reaches the switching point (defined above). From this moment the ball 58 is lifted off its seat, counteracting the pressure in the accumulator, and some of the pressure fluid from the pump 18 is directed towards the accumulator, which begins to recharge. From this time on the pressure from the pump continues to increase, but at a lower rate.

The working of the variable-volume vessel will now be described in detail. The piston 74 is permanently subjected to the same pressure as that prevailing in the control chamber 38. Any increase in this pressure results in motion of the piston 74, counteracting the resilient assembly 84.

During a first phase in which the compartments 76, 80 do not communicate, the piston 74 and ball 92 (which is urged onto its seat) are interconnected in respect of motion relative to the valve lifter 96, so that the ball 92 first makes contact with the free end of the spring 100, which it then compresses when it subsequently moves downward in the FIGURE. The first phase ends when the ball 92 makes contact with the finger 98.

At the beginning of the second phase, slight additional motion of the piston 74 causes the ball 92 to move off its seat 90, so that the pressures on both sides of the ball equalize. The ball now moves readily away from the end of the finger 98 and from the seat 90 under the influence of the expanding spring 100. The resilient assembly 84 and the length of the valve lifter 96, 98 can be selected so that the valve formed by the ball 92 opens for a given motion of the piston 74 corresponding to a predetermined pressure in the compartment 76 and control chamber 38. This predetermined pressure will be termed the "opening pressure". Since the ratio between the pressures in the annular chamber 42 and control chamber 38 is constant and depends on the ratio between the effective areas of the differential piston 40, the opening pressure corresponds to a given pressure in the annular chamber 42. The variable-volume vessel is designed so that the valve formed by the ball 92 and its seat 90 opens when the pressure in the annular chamber 42 attains a value corresponding to the "break" pressure of the accumulator, that is, the maximum pressure to which it may be recharged. In other words, the valve of the variable-volume vessel opens at the instant when the accumulator 22 is recharged completely.

As soon as the valve opens, there is laminar flow of fluid towards the second outlet orifice by way of the leakage passage defined above and by way of the passages 86, 48. There is therefore a progressive reduction in the pressure in the compartment 76 and control chamber 38. Consequently the differential piston 40 moves back, counteracting the spring 60, so as to increase the cross-section of the constriction 50 and thus cause a progressive pressure reduction in the annular chamber 42. The pressure reduction in the compartment 76 causes the piston 74 to return progressively towards its idle position under the influence of the resilient assembly 84. Since, when idle, the spring 100 is longer than the finger 98 by a length X, the valve of the variable-volume vessel remains open until the point at which the piston 74 has moved back a distance equal to X, so that the seat 90 resumes contact with the ball 92. The valve is closed again, and the compartments 76, 80 are disconnected. The distance X is calculated so that the compartments 76, 80 are disconnected when the pressure in the compartment 76 has dropped by a given quantity Δp, to reach a "closing" level. This closing level is set so that the pressure in the annular chamber 42 has fallen below the pressure prevailing in the control chamber 38 and compartment 76 when the seat 90 resumes contact with the ball 92. This is because if the valve closes before the pressure in the compartment 76 and control chamber 38 has reached such a closing level, the pressure in the annular chamber 42 will not have dropped below the pressure in the control chamber 38, and the last pressure reduction phase cannot begin. It has been found that the closing pressure must be at a level lower than the switch-to-break range of the accumulator.

The third phase runs from when the valve of the variable-volume vessel has closed again. The hydraulic fluid flows from the compartment 76 and control chamber 38 to the outlet orifice 16, by way of the restriction 56, axial passage 52, radial passage 54 and chamber 42, until the vessel is completely discharged.

Although the leakage passage illustrated in the FIGURE provides a connection between the compartment 76 and the outlet orifice 16 connected to the power steering valve 28, it is also possible for the leakage passage to be connected directly to a hydraulic fluid reservoir, without thereby exceeding the scope of the invention.

I claim:

1. A hydraulic circuit breaker comprising a housing with an inlet orifice connectable to the outlet of a hydraulic pump, a first outlet orifice connectable to the pressure chamber of a hydraulic pressure accumulator, and a second outlet orifice connectable to an open-centre hydraulic circuit, a stepped bore in said housing, a piston of the differential type having faces of smaller and larger cross sections slidable in a fluid-tight manner in said bore and defining therewith an inlet chamber communicating with the inlet orifice and a control chamber, the pressures in said inlet chamber and control chamber acting respectively on those faces of the differential piston having the smaller and larger cross sections, a constriction orifice whose cross-section is variable according to the position of the differential piston being provided between the inlet chamber and the second outlet orifice, said inlet chamber communicating with said control chamber through a first passage comprising a first restriction and being also connected to the first outlet orifice by a connection comprising a non-return valve, said circuit breaker further comprising a resilient vessel having a variable-volume compartment connected to said control chamber, said resilient vessel comprising a second bore defined in said housing, a second piston slidable in a fluid-tight manner in said second bore so as to divide said second bore into a first compartment defining said variable-volume compartment and into a second compartment, the second piston being urged towards the end of said first compartment by resilient means located in said second compartment, an axial passage connecting said first and second compartments being provided in said second piston and opening towards said first compartment to define a valve seat cooperating with a valve forming element resiliently urged onto said seat, a valve lifter element fixed relative to the housing being provided in said axial passage of the second piston, said valve lifter element being adapted to lift said valve forming element off said seat to permit fluid flow in a leakage passage when the second piston has moved a given distance which corresponds to a first predetermined value for the pressure in said first compartment, said leakage passage comprising the space defined between said valve lifter element and said axial passage, said second compartment being connected to said second outlet orifice, said leakage passage forming a second restriction, whereby said first compartment is connected to said leakage passage when the pressure in said compartment reaches a first predetermined value and said connection is interrupted when the pressure in said compartment falls below a second predetermined value.

2. A hydraulic circuit breaker as claimed in claim 1, wherein a spring is mounted in said axial passage in the second piston between said valve lifter element and said valve forming element in order to move the latter away from its seat after lifting of said valve and to keep said valve in its open position until the second piston has retracted a certain distance after a given pressure reduction in the first compartment.

3. A hydraulic circuit breaker as claimed in claim 1, wherein said constriction of variable cross-section comprises at least one groove of variable depth formed in the smaller-diameter portion of said piston of the differential type and co-operating with a shoulder in said stepped bore.

4. A hydraulic circuit breaker as claimed in claim 1, wherein a spring in said control chamber resiliently biases said piston of the differential type while counteracting the pressure in said inlet chamber.

5. A hydraulic circuit breaker as claimed in claim 1, and further comprising an abutment located in said control chamber and limiting the extent to which said piston of the differential type penetrates into said control chamber.

6. A hydraulic circuit breaker as claimed in claim 1, and wherein the open-centre hydraulic circuit comprises a power steering valve.

7. A hydraulic circuit breaker as claimed in claim 1, and wherein said leakage passage communicates with a reservoir.

8. A hydraulic circuit breaker comprising a housing with an inlet orifice connectable to the outlet of a hydraulic pump, a first outlet orifice connectable to the pressure chamber of a hydraulic pressure accumulator, and a second outlet orifice connectable to an open-centre hydraulic circuit, a stepped bore in said housing, a piston of the differential type, comprising a larger diameter portion and a smaller diameter portion separated by an annular shoulder, slidable in a fluid-tight manner in said bore and defining therewith an inlet chamber adjacent said annular shoulder and communicating with the inlet orifice and a control chamber adjacent said larger diameter portion, the pressures prevailing in said inlet chamber, said control chamber and said first outlet orifice acting respectively on said annular shoulder, said larger diameter portion and said smaller diameter portion, a constriction orifice being provided said inlet chamber and said second outlet orifice, said constriction orifice having a cross-section which is variable according to the position of said differential piston with respect to said stepped bore, said inlet chamber being connected to said control chamber through a passage comprising a first restriction and being also connected to the first outlet orifice by a connection comprising a non-return valve, said circuit breaker further comprising a resilient vessel having a variable volume compartment connected to said control chamber, said vessel comprising a valve means adapted to connect said compartment to a leakage passage comprising a second restriction when the pressure in said compartment reaches a first predetermined value and to interrupt said connection to said leakage passage when the pressure in said compartment drops below a second predetermined value.

9. A hydraulic circuit breaker as claimed in claim 8, wherein the resilient vessel comprises a second bore defined in the housing, within which a second piston is slidable in a fluid-tight manner so as to divide said second bore into a first compartment defining said variable-volume compartment and into a second compartment, the second piston being urged towards the end of said first compartment by resilient means located in said second compartment, an axial passage intended to connect the two compartments being provided in said second piston and opening towards the first compartment, said valve means comprising a valve member resiliently urged against a valve seat defined at the end of said axial passage adjacent said first compartment, a valve lifter member fixed relative to the housing being provided in said axial passage of the second piston, said valve lifter member being adapted to lift said valve member off its seat to permit the fluid to flow in the leakage passage when the second piston has moved a given distance which corresponds to said first predetermined value for the pressure in the first compartment, the leakage passage then comprising the space defined between said valve lifter member and said axial passage, and the second compartment being connected to the second outlet orifice.

10. A hydraulic circuit breaker as claimed in claim 9, wherein a spring is mounted in said axial passage in the second piston between said valve lifter member and said valve member in order to move the latter away from its seat after lifting of said valve member and to keep said valve in its open position until the second piston has retracted a certain distance after a given pressure reduction in the first compartment.

11. A hydraulic circuit breaker as claimed in claim 8, wherein said constriction of variable cross-secton comprises at least one groove of variable depth formed in the smaller-diameter portion of said piston of the differential type and cooperating with a shoulder in said stepped bore.

12. A hydraulic circuit breaker as claimed in claim 8, wherein a spring in said control chamber resiliently biases said piston of the differential type against the combined forces exerted on said annular shoulder by the pressure in said inlet chamber and on said smaller diameter portion by the pressure in said first outlet orifice, an abutment being provided in said control chamber to limit the travel of said piston of the differential type towards said control chamber.

* * * * *